United States Patent
Wolfschwenger et al.

(10) Patent No.: US 7,615,602 B2
(45) Date of Patent: Nov. 10, 2009

(54) PROCESS FOR PRODUCING POLYPROPYLENE FILM

(75) Inventors: Johannes Wolfschwenger, Niederneukirchen (AT); Manfred Kirchberger, Prambachkirchen (AT); Peter Niedersuess, Ried/Riedmark (AT); Holger Poehler, Helsinki (FI); Peter Denifl, Gries am Brenner (AT); Timo Leinonen, Tolkkinen (FI)

(73) Assignee: Borealis Technology Oy, Porvoo (FI)

( * ) Notice: Subject to any disclaimer, the term of this patent is extended or adjusted under 35 U.S.C. 154(b) by 276 days.

(21) Appl. No.: 11/597,076

(22) PCT Filed: May 13, 2005

(86) PCT No.: PCT/EP2005/005248

§ 371 (c)(1),
(2), (4) Date: Dec. 21, 2006

(87) PCT Pub. No.: WO2005/111095

PCT Pub. Date: Nov. 24, 2005

(65) Prior Publication Data

US 2008/0132660 A1   Jun. 5, 2008

(30) Foreign Application Priority Data

May 18, 2004   (EP)   ................... 04102194

(51) Int. Cl.
*C08F 210/00* (2006.01)
*C08F 110/06* (2006.01)

(52) U.S. Cl. ............... 526/348.1; 526/351; 526/124.2; 526/124.3

(58) Field of Classification Search ............. 526/348.1, 526/351, 158, 124.2, 124.3
See application file for complete search history.

(56) References Cited

U.S. PATENT DOCUMENTS

| 6,156,691 A | 12/2000 | Schweier et al. |
| 6,437,063 B1 | 8/2002 | Malm et al. |
| 6,503,993 B1 | 1/2003 | Jaaskelaeinen et al. |
| 2004/0242406 A1* | 12/2004 | Denifl et al. ............ 502/102 |
| 2005/0014662 A1* | 1/2005 | Denifl et al. ............ 508/591 |

FOREIGN PATENT DOCUMENTS

| EP | 1270610 | 1/2003 |
| EP | 1273595 | 1/2003 |

OTHER PUBLICATIONS

Jun. 5, 2001 Derwent English Abstract of KR 2001-045571.

* cited by examiner

*Primary Examiner*—Ling-Siu Choi
(74) *Attorney, Agent, or Firm*—Jordan and Hamburg LLP

(57) ABSTRACT

The invention relates to a process for producing a polypropylene film having a small dynamic coefficient of friction (CoF) and to a film obtained by this process. The invention further relates to the use of a polypropylene composition in a film forming process in order to reduce the required amount of slip agent for achieving a certain CoF and, alternatively, to the use of a polypropylene composition in a film forming process in order to reduce the required storage time for achieving a certain CoF.

6 Claims, No Drawings

PROCESS FOR PRODUCING POLYPROPYLENE FILM

BACKGROUND OF THE INVENTION

The invention relates to a process for producing a polypropylene film having a small dynamic coefficient of friction (CoF) and to a film obtained by this process. The invention further relates to the use of a polypropylene composition in a film forming process in order to reduce the required amount of slip agent for achieving a certain CoF and, alternatively, to the use of a polypropylene composition in a film forming process in order to reduce the required storage time for achieving a certain CoF.

Castfilm made of polypropylene has the disadvantage of very slow slip agent migration compared to e.g. polyethylene. Especially castfilms made of visbroken polypropylenes with a thickness of below 50 μm do after production not have the small CoF which is required for a good winding quality and also for the following conversion steps. For a good winding quality a CoF of approx. 0.35 (depending on film properties and film thickness) and for conversion a CoF below 0.2 is technically necessary and therefore a market requirement.

In order to fulfill this requirement it is state of the art to add slip agent (in combination with antiblocking agent) to the polypropylene cast film grades. The slip agent migrates to the surface of the film and creates a slippery film which lowers the CoF dramatically. Since the migration to the surface of the slip agent in polypropylene is very slow, an excessive amount of slip agent is added in order to overcome this problem and to obtain the required CoF immediately after film production for good winding quality. If less slip agent is added the CoF immediately after film production is too high and the film has to be stored for a long period (ca. 14 days) in order to achieve a sufficiently small CoF.

The disadvantages of this solution are high costs due to excessive amount of slip agent deterioration of optical film properties after a longer period of time because too much slip agent migrates to the film surface.

deposits of slip agent at the castfilm production line when films having a thickness of about 70 μm are produced.

It is therefore the object of the present invention to provide a novel process for producing a polypropylene film, by polymerising propylene and optionally ethylene and/or one or more $C_4$-$C_{10}$ α-olefins in the presence of a Ziegler-Natta catalyst to produce a polypropylene and subjecting the polypropylene to a film forming process. The produced film shall have a small dynamic coefficient of friction (CoF) (determined according to DIN 53 375, 24 hrs after production of film) compared to polypropylene films obtained from other processes (but containing—for reasons of comparability—the same amount of slip agent).

SUMMARY OF THE INVENTION

The above problem has surprisingly been solved by a process, where the Ziegler-Natta catalyst comprises an olefin polymerisation catalyst component in the form of particles having a predetermined size range, which olefin polymerisation catalyst component is obtained by preparing a solution of a complex of a Gp IIa metal and an electron donor by reacting a compound of said metal with said electron donor or a precursor thereof in an organic liquid reaction medium;

reacting said complex, in solution, with at least one compound of a transition metal to a) produce an emulsion the dispersed phase of which contains more than 50 mol % of the Gp IIa metal in said complex;

maintaining the particles of said dispersed phase within the average size range 10 to 200 μm by agitation in the presence of an emulsion stabilizer and solidifying said particles; and recovering, washing and drying said particles to obtain said catalyst component or b) to produce a denser oil phase which contains more than 50 mol % of the Gp IIa metal in said complex and an oil phase immiscible therewith;

preferentially sorbing said denser oil on a carrier having an average particle size of 10 to 200 μm and a pore volume of 0.5 to 4 ml/g;

solidifying said sorbed oil contained by said carrier; and recovering, washing and drying the carrier to obtain said catalyst component.

With this invention it is surprisingly either possible to use the slip agent in a smaller amount or—when the amount of slip agent is not reduced—to achieve the required CoF almost immediately after production due to accelerated slip agent migration. Furthermore the required CoF of 0.2 for conversion is obtained considerably sooner and no or less deterioration of optical properties of the film is observed since no excessive amount of slip agent is necessary. With this invention a considerable cost saving due to reducing the required amount of slip agent is possible.

It has surprisingly been found, that films which are produced from polypropylenes, which are polymerised with the above described catalyst components apparently do show a very fast slip agent migration and have a very small CoF already 1 day after film production.

If conventional catalysts are used for polymerisation of polypropylene, films therefrom may take from 3 to 7 days until a CoF is reached, which allows conversion of the films.

The catalyst components which are described above are disclosed in EP1273595A1 (variant a) and EP1270610A1 (variant b). The entire disclosure of each of the aforementioned patent applications is enclosed herein by reference.

Each of the aforementioned patent applications is the basis of specific preferred embodiments.

The catalyst component which is used according to the present invention may be supported on a carrier or the component itself may be used.

Therefore, according to a first embodiment, the catalyst component is obtained by preparing a solution of magnesium complex by reacting an alkoxy magnesium compound and an electron donor or precursor thereof in a $C_6$-$C_{10}$ aromatic liquid reaction medium; reacting said magnesium complex with a compound of at least one IV valent Gp IVB metal at a temperature greater than 10° C. and less than 60° C., to produce an emulsion of a denser, $TiCl_4$/toluene-insoluble, oil dispersed phase having Gp IVB metal/Mg mol ratio 0.1 to 10 in an oil disperse phase having Gp IVB metal/Mg mol ratio 10 to 100; maintaining the particles of said dispersed phase within the size range 10 to 200 μm by agitation in the presence of an emulsion stabilizer while heating the emulsion to solidify said particles; and recovering, washing and drying said particles to obtain said catalyst component.

According to the aforementioned embodiment the catalyst component itself is used.

According to an embodiment, a turbulence minimising agent is added into the reaction mixture before solidifying the particles of the dispersed phase, said turbulence minimising agent being inert and soluble in the reaction mixture under the reaction conditions. The turbulence minimizing agent (TMA) or mixtures thereof are preferably polymers having linear aliphatic carbon backbone chains, which may be branched with short side chains only in order to serve for uniform flow conditions when stirring. Said TMA is in particular preferably selected from α-olefin polymers having a high molecular weight of MW about $1\text{-}40\times10^6$, or mixtures thereof. Especially preferred are polymers of α-olefin monomers with 6 to 20 carbon atoms, and more preferably polyoctene, polynonene, polydecene, polyundecene or polydodecene or mixtures thereof, having the molecular weight and general backbone structure as defined before, and most preferable TMA is polydecene.

According to a further embodiment, the catalyst component is obtained by preparing a solution of magnesium complex by reacting an alkoxy magnesium compound and an electron donor or precursor thereof in a $C_6$-$C_{10}$ aromatic liquid reaction medium; reacting said magnesium complex with a compound of at least one IV valent Gp IVB metal at a temperature greater than 10° C. and less than 60° C., to produce a denser, $TiCl_4$/toluene-insoluble, oil dispersed phase having Gp IVB metal/Mg mol ratio 0.1 to 10 and an oil immiscible therein having Gp IVB metal/Mg mol ratio 10 to 100; preferentially sorbing said denser oil on a carrier having an average particle size of 10 to 200 μm and a pore volume of 0.5 to 4 ml/g, heating the carrier containing said sorbed oil to solidify said sorbed oil, and recovering, washing and drying the carrier to obtain said catalyst component.

According to the aforementioned embodiment the catalyst component is absorbed on a carrier and the loaded carrier is used.

In the above embodiments the preferred embodiments of "alkoxy magnesium compound", "electron donor", "$C_6$-$C_{10}$ aromatic liquid reaction medium", "compound of IV valent Gp IVB metal", "carrier" etc. are those of the respective patents in which the catalyst components are disclosed.

In particular, the alkoxy magnesium compound is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesiums, alkyl magnesium alkoxides, alkyl magnesium halides and magnesium dihalides. The magnesium compound can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula $R_2Mg$, wherein each one of the two Rs is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an octyl group, i.e. the dialkyl magnesium compound is butyl octyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium, alkyl magnesium alkoxide or magnesium dihalide can react with a polyhydric alcohol $R'(OH)_m$ or with a monohydric alcohol R'OH or a mixture thereof.

Typical $C_2$-$C_{16}$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, trimethylol propane and tetrols such as pentaerythritol. The polyhydric alcohol can be selected on the basis of the activity and morphology it gives the catalyst component. E.g. larger particle size and broader particle size distribution can be obtained by using ethylene glycol.

The aromatic reaction medium may also contain a monohydric alcohol, which may be straight- or branched-chain. Typical $C_1$-$C_{20}$ monohydric alcohols are methanol, ethanol, n-propanol, iso-propanol, n-butanol, iso-butanol, sec.butanol, tert.butanol, n-amyl alcohol, iso-amyl alcohol, sec.amyl alcohol, tert.amyl alcohol, diethyl carbinol, akt. amyl alcohol, sec. isoamyl alcohol, tert.butyl carbinol. Typical $C_6$-$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. Typical >$C_{10}$ monohydric alcohols are n-1-undecanol, n-1-dodecanol, n-1-tridecanol, n-1-tetra-decanol, n-1-pentadecanol, 1-hexadecanol, n-1-heptadecanol and n-1-octadecanol. The monohydric alcohols may be unsaturated, as long as they do not act as catalyst poisons.

Preferable monohydric alcohols are those of formula R'OH in which R' is a $C_2$-$C_{16}$ alkyl group, most preferably a $C_4$-$C_{12}$ alkyl group, particularly 2-ethyl-1-hexanol.

The electron donor is preferably an aromatic carboxylic acid ester, dioctyl phthalate being particularly preferred. It may be formed in situ by reaction of an aromatic carboxylic acid chloride precursor with a $C_2$-$C_{16}$ alkanol and/or diol.

Preferably, essentially all of the aromatic carboxylic acid ester is a reaction product of a carboxylic acid halide, preferably a dicarboxylic acid dihalide, more preferably an unsaturated α,β-dicarboxylic acid dihalide, most preferably phthalic acid dichloride, with the monohydric alcohol and/or polyhydric alcohol.

The compound of a four-valent Gp IVB metal compound containing a halogen is preferably a titanium tetrahalide. Equivalent to titanium tetrahalide is the combination of an alkoxy titanium halide and a halogenation agent therefor, which are able to form a titanium tetrahalide in situ. The most preferred halide is the chloride, for zirconium and hafnium as well as for titanium.

The $C_6$-$C_{10}$ aromatic liquid reaction medium used as solvent in the reaction is preferably selected from hydrocarbons such as substituted and unsubstituted benzenes, preferably from alkylated benzenes, more preferably from toluene and the xylenes, and is most preferably toluene.

In the embodiment where a carrier is used to absorb the catalyst component, the carrier may comprise a refractory inorganic oxide, a salt or an organic polymer having a softening point greater than 150° C. Examples of favoured materials include silica, magnesium chloride and cross-linked polystyrene resin.

As is known, the addition of at least one halogenated hydrocarbon during the production process of the catalyst component can lead to further improved catalytic activity. Reactive halogenated hydrocarbons preferably have the formula R'''X'''$_n$ wherein R''' is an n-valent $C_1$-$C_{20}$ alkyl group, particularly a $C_1$-$C_{10}$ alkyl group, X''' is a halogen, preferably chlorine, and n is an integer from 1 to 4, preferably 1 or 2.

Such chlorinated hydrocarbons include monochloromethane, dichloromethane, trichloromethane (chloroform), tetrachloromethane, monochloroethane, (1,1)-dichloroethane, (1,2)-dichloroethane, (1,1,1)-trichloroethane, (1,1,2)-trichloroethane, (1,1,1,2)-tetrachloroethane, (1,1,2,2)-tetrachloroethane, pentachloroethane, hexachloroethane, (1)-chloropropane, (2)-chloropropane, (1,2)-dichloropropane, (1,3)-dichloropropane, (1,2,3)-trichloropropane, (1)-chlorobutane, (2)-chlorobutane, isobutyl chloride, tert.butyl chloride, (1,4)-dichlorobutane, (1)-chloropentane, (1,5)-dichloropentane. The chlorinated hydrocarbons may also be unsaturated, provided that the unsaturation does not act as catalyst poison in the final catalyst component.

Preferred compounds include butyl chloride (BuCl), dichloroalkanes such as (1,4)-dichlorobutane, and tertiary butyl chloride.

When the embodiment according to the invention encompasses the use of an emulsion stabiliser, this is typically a surfactant, of which the preferred class is that based on acrylic polymers.

The catalyst components which are obtained as described above and in the patents which are included herein by reference, are used in a conventional way for the preparation of olefin polymerisation catalysts in association with an alkyl aluminium cocatalyst and an external donor.

A preferred alkyl aluminium cocatalyst is triethylaluminium (TEAl), preferred external donors are cyclohexyl-dimethoxy-methyl-silane and di-cyclopentyl-di-methoxy-silane.

General Description of Propylene (co)Polymerisation

The propylene polymer may be produced by single- or multistage process polymerisation of propylene or propylene and α-olefin and/or ethylene such as bulk polymerisation, gas phase polymerisation, slurry polymerisation, solution polymerisation or combinations thereof using the catalysts and catalyst components as herein described. Those processes are well known to one skilled in the art.

A preferred process is a combination of bulk slurry loop reactor(s) and gas phase reactor(s). A homo- or copolymer can be made either in loop reactors or in a combination of loop and gas phase reactors. The polymer produced in this way may be transferred into another reactor, where e.g. a different propylene polymer is polymerised on top of the product of the first reactor, e.g. when propylene/α-olefin rubber is polymerised. Preferably this polymerisation step is done in a gas phase polymerisation.

One skilled in the art is aware of the various possibilities to produce propylene homo- and copolymers and will simply find out a suitable procedure to produce suitable polymers which are used in the present invention.

Film Production

The polypropylene which is produced according to the invention can be converted into films with conventional methods:

Cast Film Technology

In this technology for producing polymer films, the molten polymer is extruded through a slot die fed by a (normally single-screw) extruder onto a first cooled roll, the so-called chill-roll. From this roll, the already solidified film is taken up by a second roll (nip roll or takeup roll) and transported to a winding device after trimming the edges.

Blown Film Technology with Water Contact Cooling Ring

In this technology for producing polymer films, the molten polymer is extruded through a tubular die fed by a (usually single-screw) extruder and blown up to a tube. The film tube has contact on the exterior side to a water cooling ring and is cooled down quickly. The already solidified film tube is flattened afterwards by take-up rolls and taken off to a winder.

For a more detailed description see "Polypropylene Handbook", edited by Edward P. Moore, Jr., Hanser Publishers, 1996.

Monoaxially Oriented PP Film (MOPP)

Based on a cast film, a solid-state orientation step below the melting temperature is applied before winding.

Biaxially Oriented PP Film (BOPP)

Two main technologies are used for this process, which are described in detail in A. Ajji & M. M. Dumoulin, *Biaxially oriented polypropylene (BOPP) process*, in: J. Karger-Kocsis (Ed.) *Polypropylene: An A-Z Reference*, Kluwer, Dordrecht 1999, 60-67. Orientation and properties are determined by the draw ratio and details of the process; the films have generally the highest crystallinity and stiffness achievable.

Polypropylene films require a certain maximum CoF, before further processing. Immediately after production the CoF is high (e.g. 0.7-1.0) and the film is stored to allow the slip agent (e.g. oleic acid amide and/or erucic acid amide) to migrate to the film surface. This results in a decrease of CoF and, when the CoF has reached a value of about 0.30 or below, the film can be further processed.

Therefore, a further aspect of the invention relates to a method for reducing the necessary amount of slip agent which is necessary to achieve a CoF$\leqq$0.30 (acc. to DIN 53 375, 7 days after production of film).

The reduction of slip agent is made possible by manufacturing the film from a polypropylene composition which comprises a polypropylene obtained by polymerising propylene and optionally ethylene and/or one or more $C_4$-$C_{10}$ α-olefins in the presence of a Ziegler-Natta catalyst, which catalyst comprises an olefin polymerisation catalyst component in the form of particles having a predetermined size range, which olefin polymerisation catalyst component is obtained by preparing a solution of a complex of a Gp IIa metal and an electron donor by reacting a compound of said metal with said electron donor or a precursor thereof in an organic liquid reaction medium;

reacting said complex, in solution, with at least one compound of a transition metal to a) produce an emulsion the dispersed phase of which contains more than 50 mol % of the Gp IIa metal in said complex;

maintaining the particles of said dispersed phase within the average size range 10 to 200 μm by agitation in the presence of an emulsion stabilizer and solidifying said particles; and recovering, washing and drying said particles to obtain said catalyst component or b) to produce a denser oil phase which contains more than 50 mol % of the Gp IIa metal in said complex and an oil phase immiscible therewith;

preferentially sorbing said denser oil on a carrier having an average particle size of 10 to 200 μm and a pore volume of 0.5 to 4 ml/g;

solidifying said sorbed oil contained by said carrier; and recovering, washing and drying the carrier to obtain said catalyst component.

It has been found, that the typical amount of slip agent of 0.2 wt % can typically be reduced to about 0.1 wt % or even below without necessitating a longer storage time. Reducing the amount of slip agent reduces the costs for the slip agent and it improves the optical qualities of the films and it also improves the applicability of the films for food applications.

While it is a target to reduce the amount of slip agent in polypropylene films, it is equally desirable to reduce the storage time which is necessary to achieve a CoF to allow further processing of the films. Until now it was only possible to reduce storage times by increasing the amount of slip agent or by storing the films at higher temperatures. Both measures are costly and detrimental to some properties of the films.

Therefore, a further aspect of the invention relates to a method for reducing the required storage time necessary to achieve a CoF≦0.30 (acc. to DIN 53 375).

The reduction of storage time is made possible by manufacturing the film from a polypropylene composition which comprises a polypropylene obtained by polymerising propylene and optionally ethylene and/or one or more $C_4$-$C_{10}$ α-olefins in the presence of a Ziegler-Natta catalyst, which catalyst comprises an olefin polymerisation catalyst component in the form of particles having a predetermined size range, which olefin polymerisation catalyst component is obtained by preparing a solution of a complex of a Gp IIa metal and an electron donor by reacting a compound of said metal with said electron donor or a precursor thereof in an organic liquid reaction medium;

reacting said complex, in solution, with at least one compound of a transition metal to a) produce an emulsion the dispersed phase of which contains more than 50 mol % of the Gp IIa metal in said complex;

maintaining the particles of said dispersed phase within the average size range 10 to 200 μm by agitation in the presence of an emulsion stabilizer and solidifying said particles; and recovering, washing and drying said particles to obtain said catalyst component or b) to produce a denser oil phase which contains more than 50 mol % of the Gp IIa metal in said complex and an oil phase immiscible therewith;

preferentially sorbing said denser oil on a carrier having an average particle size of 10 to 200 μm and a pore volume of 0.5 to 4 ml/g;

solidifying said sorbed oil contained by said carrier; and recovering, washing and drying the carrier to obtain said catalyst component.

It has been found that with the typical load of slip agent of about 0.2 wt % can be reduced from the typical 7 or more days down to 3 days or less. In some cases the film has an acceptable CoF already 1 day after production.

Description of Measurement Methods

MFR

The melt flow rates were measured with a load of 2.16 kg at 230° C. The melt flow rate is that quantity of polymer in grams which the test apparatus standardised to ISO 1133 extrudes within 10 minutes at a temperature of 230° C. under a load of 2.16 kg.

Comonomer Contents

Comonomer contents (ethylene) were measured with Fourier transform infrared spectroscopy (FTIR) calibrated with $^{13}$C-NMR.

The dynamic Coefficient of Friction (CoF) as a measure of the frictional behaviour of the film was determined according to DIN 53 375 on film samples with a thickness of 30 μm or 50 μm (actual film thickness is indicated in table 1). Immediately after film production the film has been stored at room temperature (23° C.) for 1, 3, 7, 14, 21 and 28 days. Measurement of the CoF was then performed at 23° C.

DETAILED DESCRIPTION OF THE INVENTION

Examples

A catalyst component A

B catalyst component B

C preparation of catalyst C

D preparation of catalyst D

E preparation of catalyst E

Example A

Preparation of Catalyst Component A of Film Examples 2-4

A magnesium complex solution was prepared by adding over a 40 minute period, with stirring, 110 ml of a 20% solution in toluene of BOMAG-A (Tradename) [Mg(Bu)$_{1.5}$(Oct)$_{0.5}$] to 38.9 ml of 2-ethylhexanol which had been cooled to 5° C. in a 300 ml glass reactor. During the addition the reactor contents were maintained below 15° C. The temperature was then raised to 60° C. and held at that level for 30 minutes with stirring, at which time reaction was complete. 6.4 ml phthaloyl chloride was then added over an 11 minute period. The reactor contents were stirred at 60° C. for 20 minutes, 12.9 ml 1-chlorobutane was added, and stirring continued for another 15 minutes at 60° C. The resulting stable, yellow Mg complex solution was cooled to room temperature.

19.5 ml TiCl$_4$, 10 ml n-pentane and 32.0 g of the above-prepared Mg complex solution were reacted with stirring at 25° C. in a 300 ml glass reactor. After 5 minutes, reaction was complete and a dark red emulsion had formed. To this emulsion were added 2.0 g of a 40 μm particle size silica (silica SYLOPOL 55SJ, Grace) in 2.0 ml TiCl$_4$ and the temperature of the mixture was raised to 90° C. over 30 minutes and maintained at that temperature, with stirring, for a further 30 minutes. After settling and syphoning the solids underwent washing with:

1. 100 ml toluene+5 ml TiCl4 at 90° C. for 30 minutes;

2. 60 ml heptane, at 90° C. for 10 minutes;

3. 60 ml heptane, at 90° C. for 10 minutes;

4. 60 ml pentane, at room temperature for 5 minutes; and 5. 60 ml pentane, at room temperature for 5 minutes.

The solids were then dried at 60° C. by nitrogen purge, to yield a yellow, air-sensitive powder.

Example B

Preparation of Catalyst Component B of Film Examples 1, 5 and 6

A magnesium complex solution was prepared by slowly adding over a 40 minute period, with stirring, 110 ml of a 20% solution in toluene of BOMAG-A (Tradename) [$Mg(Bu)_{1.5}$ $(Oct)_{0.5}$] to 38.9 ml of 2-ethylhexanol which had been cooled to 5° C. in a 300 ml glass reactor. During the addition the reactor contents were maintained below 15° C. The temperature was then raised to 60° C. and held at that level for 30 minutes with stirring, at which time reaction was complete. 6.4 ml phthaloyl chloride was then added over an 11 minute period. The reactor contents were stirred at 60° C. for 20 minutes, 12.9 ml 1-chlorobutane was added, and stirring continued for another 15 minutes at 60° C. The resulting stable, yellowish Mg complex solution was cooled to room temperature.

19.5 ml $TiCl_4$, 5 ml heptane and 28.7 g of the above-prepared Mg complex solution were reacted at 25° C. in a 300 ml glass reactor. After 5 minutes, reaction was complete and a dark red emulsion had formed. The temperature was raised to 50° C., 2 ml of Viscoplex 1-254 (Tradename) (40-44% of acrylic polymer in base oil) was added, and the reactor contents were stirred for 30 minutes. The resulting stabilised emulsion was then heated to 90° C., with stirring, for 10 minutes to solidify the particles forming the dispersed phase. After settling and syphoning the solids (2.6 grams) underwent washing with:

1. 100 ml toluene at 90° C. for 30 minutes;

2. 60 ml heptane, at 90° C. for 20 minutes;

3. 60 ml heptane, at 35° C. for 10 minutes;

4. 60 ml pentane, at 30° C. for 5 minutes; and 5. 60 ml pentane, at 30° C. for 5 minutes.

The solids were then dried at 60° C. by nitrogen purge.

Example C

Preparation of Polymerisation Catalyst C for Film Examples 2-4

0.9 ml triethyl aluminium (TEA) (co-catalyst), 0.12 ml cyclohexyl methyl dimethoxy silane (CMMS) as an external donor and 30 ml n-pentane were mixed and allowed to react for 5 minutes. Half of the mixture was then added to a polymerisation reactor and the other half was mixed with 20 mg of components prepared in Example A. After an additional 5 minutes the component TEA/donor/n-pentane mixture was added to the reactor. The Al/Ti mole ratio of the resulting polymerisation catalyst was 250 mol/mol and the Al/CMMS mole ratio was 10 mol/mol.

Example D

Preparation of Polymerisation Catalyst D for Film Examples 1, 5 and 6

0.9 ml triethyl aluminium (TEA) (co-catalyst), 0.12 ml cyclohexyl methyl dimethoxy silane (CMMS) as an external donor and 30 ml n-pentane were mixed and allowed to react for 5 minutes. Half of the mixture was then added to a polymerisation reactor and the other half was mixed with 20 mg of the components prepared in Example B. After an additional 5 minutes the component TEA/donor/n-pentane mixture was added to the reactor. The Al/Ti mole ratio of the resulting polymerisation catalyst was 250 mol/mol and the Al/CMMS mole ratio was 10 mol/mol.

Catalysts for Comparative Examples

MC L1, the catalyst which is used in comparative examples 1, 2, 5 and 6 is commercially available from BASELL.

Preparation of Polymerisation Catalyst E for Comparative Film Examples 3 and 4

1100 kg of $TiCl_4$ was fed to a reactor and cooled to −20° C. 77 kg of $MgCl_2$ carrier obtained by spray-crystallizing $MgCl_2$ $(C_2H_5OH)_n$ melt was suspended in 223 kg aliphatic hydrocarbon solvent (bp. 90-110° C.) and cooled before adding it to the cold $TiCl_4$. Controlled heating to 130° C. was performed. During heating di-2-ethyl-hexyl phthalate (DOP) was added, and transesterification (DOP to DEP, diethyl phthalate) effected by keeping the mixture for 30 minutes at 130° C. The solid was separated by filtration. The procedure was repeated 3 times, each repeat adding the $TiCl_4$ to the filtered solid recovered from the previous titanation. The catalyst, resulting from the third repeat, was washed 4 times with the aliphatic hydrocarbon solvent and dried in vacuum to free flowing powder.

Preparation of Propylene Polymers for Film Examples

Example 1

The catalyst C was used in a polymerisation reaction in a 5 litre reactor at 70° C. 60 mmol Hydrogen and 1400 g propylene were fed to the reactor. A TEA/CMMS solution (Al/Ti ratio of 250/1 mol/mol; Al/Donor ratio of 10/1 mol/mol) was fed to the reactor together with 20 mg catalyst. The duration of the polymerisation was 60 minutes. During the polymerisation ethylene has been continuously added. The total amount of ethylene added was 40 g. The resulting propylene polymer had an MFR of 1.6 g/10 min and an ethylene content of 3.5 wt %.

Example 2

The catalyst C was used in a polymerisation reaction in a 5 litre reactor at 70° C. 60 mmol Hydrogen and 1400 g propylene were fed to the reactor. A TEA/CMMS solution (Al/Ti ratio of 250/1 mol/mol; Al/Donor ratio of 10/1 mol/mol) was fed to the reactor together with 20 mg catalyst. The duration of the polymerisation was 60 minutes. During the polymerisation ethylene has been continuously added. The total amount of ethylene added was 40 g. The resulting propylene polymer had an MFR of 1.5 g/10 min and an ethylene content of 4.9 wt %.

Example 5

The catalyst D was used in a polymerisation reaction in a 5 litre reactor at 70° C. 250 mmol Hydrogen and 1400 g propylene were fed to the reactor. A TEA/CMMS solution (Al/Ti ratio of 250/1 mol/mol; Al/Donor ratio of 10/1 mol/mol) was fed to the reactor together with 20 mg catalyst. The duration of the polymerisation was 60 minutes. During the polymerisation ethylene has been continuously added. The total amount of ethylene added was 40 g. The resulting propylene polymer had an MFR of 4.9 g/10 min and an ethylene content of 3.4 wt %.

The polymerisation procedures for the other examples and for the comparative examples were performed analogously to the procedures above, except that the amounts of hydrogen, ethylene, propylene and other polymerisation parameters were varied in order to achieve the MFR and ethylene contents as specified in table 1 and the respective catalyst which is indicated in the table was used.

Visbreaking and Compounding

The powders and the additives were mixed together in a Henschel-mixer and compounded at a twin screw extruder at a temperature of 250° C. For visbreaking from the basic melt flow rate to a melt flow rate of about 7 to 9 g/10 min di-tert-butylperoxide was added during the compounding step. The strands were quenched in cold water and pelletized.

Film Forming Examples

The process for production of cast films is a widely used technique. A description of the process is published in "Polypropylene Handbook", edited by Edward P. Moore, Jr., Hanser Publishers, 1996

For production of the films for the examples and comparative examples a single screw extruder (supplied by Plamex Maschinenbau GmbH, Kelberg/Germany) having a diameter (D) of 30 mm and a screw length of 20D equipped with a T-die was used under the conditions of a cylinder temperature of 250° C., a die temperature of 260° C. and a chill roll temperature of 15° C. to produce mono layer films with a thickness of 30 μm and 50 μm, resp.

CoF values were measured at the indicated storage times. The CoF values are shown in table 1 maintaining the particles of said dispersed phase within an average size range 10 to 200 μm by agitation in the presence of an emulsion stabilizer and solidifying said particles; and recovering, washing and drying said particles to obtain said catalyst component or b) to produce a first oil phase which contains more than 50 mol % of the Gp IIa metal in said complex and a second oil phase immiscible therewith, the oil of the first oil phase being denser than the oil of the second oil phase;
sorbing said denser oil on a carrier having an average particle size of 10 to 200 μm and a pore volume of 0.5 to 4 ml/g;
solidifying said sorbed oil contained by said carrier;
recovering, washing and drying the carrier to obtain said catalyst component.

2. Process according to claim 1, wherein the catalyst component is obtained by preparing a solution of magnesium complex by reacting an alkoxy magnesium compound and an electron donor or precursor thereof in a $C_6$-$C_{10}$ aromatic liquid reaction medium; reacting said magnesium complex with a compound of at least one IV valent Gp IVB metal at a temperature greater than 10° C. and less than 60° C., to produce an emulsion of a denser, $TiCl_4$/toluene-insoluble, oil dispersed phase having Gp IVB metal/Mg mol ratio 0.1 to 10 in an oil disperse phase having Gp IVB metal/Mg mol ratio 10 to 100; maintaining the particles of said dispersed phase within the size range 10 to 200 μm by agitation in the presence of an emulsion stabilizer while heating the emulsion to solidify said

TABLE 1

| no. | oleic acid amide [wt %] | erucic acid amide [wt %] | start MFR [g/10'] | C2-content [wt %] | catalyst | MFR (230° C./2.16 kg) [g/10'] | CoF 1 d | CoF 3 d | CoF 7 d | CoF 14 d | CoF 21 d | CoF 28 d |
|---|---|---|---|---|---|---|---|---|---|---|---|---|
| example 1 | 0.1 | 0.1 | 1.6 | 3.5 | D | 7.0 | 0.38 | 0.25 | 0.2 | 0.19 | | 0.19 |
| comp. ex. 1 | 0.1 | 0.1 | 1.6 | 3.5 | MC L1 | 8.3 | 0.65 | 0.39 | 0.28 | 0.17 | | 0.19 |
| example 2 | 0.2 | — | 1.5 | 4.9 | C | 8.0 | 0.24 | | | | 0.1 | |
| comp. ex. 2 | 0.2 | — | 1.5 | 4.8 | MC L1 | 8.0 | 0.64 | | | | 0.13 | |
| example 3 | 0.1 | 0.1 | 1.4 | 4.3 | C | 7.7 | 0.33 | | 0.15 | | 0.11 | |
| comp. ex. 3 | 0.1 | 0.1 | 1.5 | 4.3 | E | 7.2 | 0.64 | | 0.32 | | 0.19 | |
| example 4 | 0.1 | 0.1 | 1.5 | 4.2 | C | 7.5 | 0.43 | | 0.15 | | 0.11 | |
| comp. ex. 4 | 0.1 | 0.1 | 1.5 | 4.3 | E | 8.1 | 0.7 | | 0.31 | | 0.21 | |
| example 5 | 0.1 | 0.1 | 4.9 | 3.4 | D | 7.3 | 0.22 | 0.17 | 0.17 | 0.18 | | 0.18 |
| comp. ex. 5 | 0.1 | 0.1 | 4.9 | 3.5 | MC L1 | 8.3 | 0.44 | 0.22 | 0.18 | 0.17 | | 0.17 |
| example 6 | 0.075 | 0.075 | 1.5 | 3.6 | D | 8.3 | 0.32 | 0.14 | 0.14 | 0.12 | | 0.14 |
| comp. ex. 6 | 0.075 | 0.075 | 1.6 | 3.6 | MC L1 | 8.1 | 0.77 | 0.66 | 0.56 | 0.48 | | 0.41 |

The invention claimed is:

1. Process for producing a polymer film, comprising polymerizing at least one monomer comprising propylene in the presence of a Ziegler-Natta catalyst to produce a polymer comprising propylene units and forming the polymer into a film, wherein the Ziegler-Natta catalyst comprises an olefin polymerization catalyst comprising particles of size within a predetermined range, the olefin polymerization catalyst being obtained by preparing a solution of a complex of a Gp IIa metal and an electron donor by reacting a compound of said metal with said electron donor or a precursor thereof in an organic liquid reaction medium; reacting said complex in solution with at least one compound of a transition metal a) to produce an emulsion comprising a dispersed phase containing more than 50 mol % of the Gp IIa metal in said complex;

particles; and recovering, washing and drying said particles to obtain said catalyst component.

3. Process according to claim 2, wherein a turbulence minimizing agent is added into the reaction mixture before solidifying the particles of the dispersed phase, said turbulence minimizing agent being inert and soluble in the reaction mixture under the reaction conditions.

4. Process according to claim 1, wherein the catalyst component is obtained by preparing a solution of magnesium complex by reacting an alkoxy magnesium compound and an electron donor or precursor thereof in a $C_6$-$C_{10}$ aromatic liquid reaction medium; reacting said magnesium complex with a compound of at least one IV valent Gp IVB metal at a temperature greater than 10° C. and less than 60° C., to produce a denser, TiCl$_4$/toluene-insoluble, oil dispersed phase having Gp IVB metal/Mg mol ratio 0.1 to 10 and an oil immiscible therein having Gp IVB metal/Mg mol ratio 10 to 100; preferentially sorbing said denser oil on a carrier having an average particle size of 10 to 200 µm and a pore volume of 0.5 to 4 ml/g, heating the carrier containing said sorbed oil to solidify said sorbed oil, and recovering, washing and drying the carrier to obtain said catalyst component.

5. Process according to claim 1, wherein the at least one monomer consists essentially of propylene.

6. Process according to claim 1, wherein the at least one monomer comprises propylene and at least one member of the group consisting of ethylene and C$_4$-C$_{10}$ α-olefins.

* * * * *